United States Patent [19]

Kakiwaki et al.

[11] Patent Number: 5,259,563

[45] Date of Patent: Nov. 9, 1993

[54] MAGNETIC RECORDING/REPRODUCING APPARATUS WITHOUT CAPSTAN

[75] Inventors: Shigeaki Kakiwaki; Tohru Okuda; Shigemi Asai, all of Nara; Masaji Tsuji, Yamatokoriyama, all of Japan

[73] Assignee: Sharp Kabushiki Kaisha, Osaka, Japan

[21] Appl. No.: 612,348

[22] Filed: Nov. 13, 1990

[30] Foreign Application Priority Data

| Nov. 13, 1989 | [JP] | Japan | 1-294459 |
| Jul. 19, 1990 | [JP] | Japan | 2-192314 |
| Jul. 20, 1990 | [JP] | Japan | 2-193459 |
| Jul. 20, 1990 | [JP] | Japan | 2-193565 |

[51] Int. Cl.⁵ .................... G11B 15/093; B65H 59/38
[52] U.S. Cl. .................... 242/191; 242/186; 360/73.09; 360/73.14
[58] Field of Search ............... 242/191, 186; 360/73.09, 73.14

[56] References Cited

U.S. PATENT DOCUMENTS

| 4,001,552 | 1/1977 | Muller | 242/191 X |
| 4,381,089 | 4/1983 | Kondo | 242/191 |
| 4,497,459 | 2/1985 | Yoshino et al. | 360/73.14 X |
| 4,525,654 | 6/1985 | Tajima et al. | 242/75.51 X |
| 4,531,166 | 7/1985 | Anderson | 360/73.09 X |
| 4,739,950 | 4/1988 | Goker et al. | 242/75.52 X |
| 4,786,992 | 11/1988 | Tajima et al. | 360/73.14 X |
| 5,032,938 | 7/1991 | Tajima et al. | 242/75.5 X |
| 5,085,379 | 2/1992 | Uchikoshi et al. | 360/73.14 |

OTHER PUBLICATIONS

"Magnetic Tape Recording Technique" Denshi Gijutsu vol. 22, No. 9, Sep. 1972, pp. 60–66.

*Primary Examiner*—David L. Robertson
*Attorney, Agent, or Firm*—David G. Conlin; George W. Neuner

[57] ABSTRACT

A magnetic recording/reproducing apparatus includes a guide roller which rotates as magnetic tape runs, and the running speed of the tape is detected on the basis of the rotation of the guide roller. The magnetic recording/reproducing apparatus further calculates a radius of a supply reel from the rotation of the guide roller and the rotation speed of the supply reel, calculates driving torque of the supply reel from the calculated result, and the supply reel is driven so that the tension of the magnetic tape is kept constant according to the calculated result.

10 Claims, 4 Drawing Sheets

MAGNETIC RECORDING/REPRODUCING APPARATUS WITHOUT CAPSTAN

BACKGROUND OF THE INVENTION

1. Field of the invention

The present invention relates to a magnetic recording/reproducing apparatus which can control a running speed and tension of magnetic tape constant, and more particularly to a magnetic recording/reproducing apparatus of so-called reel-to-reel type employing no capstan.

2. Description of the Background Art

For precise recording/reproducing with high density in a magnetic recording/reproducing apparatus employing magnetic tape, as well as maintaining running speed of the tape constant, the tension applied to the magnetic tape must be maintained constant.

Therefore, in a conventional magnetic recording/reproducing apparatus, the running speed of the magnetic tape is kept constant by pressure-driving the magnetic tape using a capstan and a pinch roller, for example. The tension applied to the magnetic tape is controlled to be constant by a tension detection mechanism called a tension arm.

Figure 5:
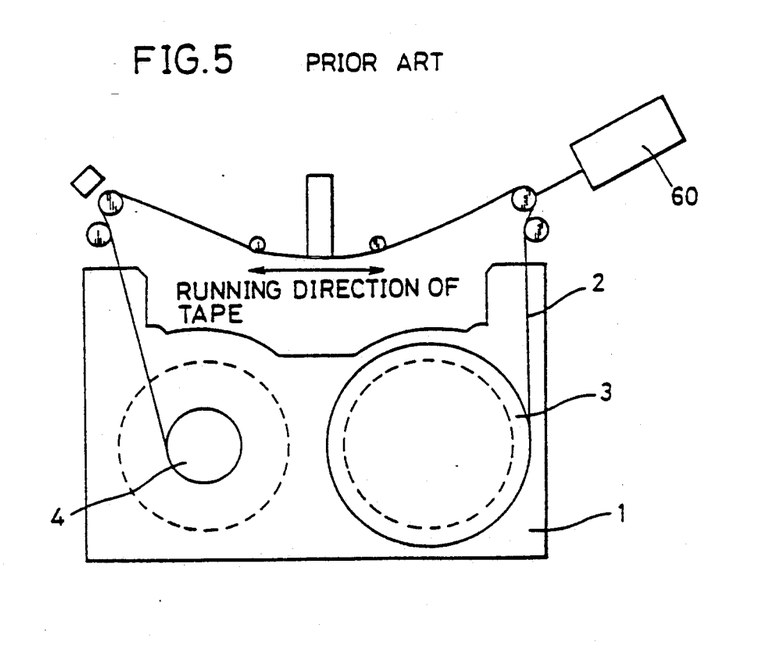
FIG. 5 is a schematic structural diagram of a conventional magnetic recording/reproducing apparatus.

A schematic structural diagram of a conventional magnetic recording/reproducing apparatus is shown in FIG. 5.

Referring to FIG. 5, in conventional magnetic recording/reproducing apparatus, the running speed of magnetic tape 2 is controlled by a capstan or the like, and the tension is controlled to be constant by a mechanism employing a tension arm 60 or the like. Accordingly, when the running speed of magnetic tape 2 becomes high, the running speed can not be precisely controlled, and resonance is produced between the magnetic tape 2 and the tension arm 60. As a result, there are problems that the tension applied to the magnetic tape 2 can not be controlled to be constant and the entire structure becomes complicated.

Then, a so-called reel-to-reel type magnetic recording/reproducing apparatus in which a magnetic tape 2 is directly moved from a reel 3 to a reel 4 without employing a capstan has been devised. In this reel-to-reel type magnetic recording/reproducing apparatus, the running speed of magnetic tape 2 is controlled by detecting rotation of a rotation type speed detection roller or reels 3, 4. That is, feed back control is performed by detecting the rotational cycle, finding an error between a predetermined cycle and the same, amplifying the same, and providing the same to a reel driving motor. The tension applied to the magnetic tape 2 is kept constant by detecting a tape tension and supplying corresponding torque to a supply reel.

However, the above-described reel-to-reel type magnetic recording/reproducing apparatus has the following problems.

That is, because of the resonance between reels 3, 4 and magnetic tape 2, a gain of a control loop can not be set high. Accordingly, highly precise control can not be performed.

Next, the reason why resonance is produced between reels 3, 4 and magnetic tape 2 will be described.

The two reels 3, 4 with the tape 2 laying across them constitute a spring system (reels 3, 4 can be regarded as inertia and tape 2 as a spring). Accordingly, especially when reel 3 on one side only is controlled, since torque is applied only to one inertia, expansion and contraction of the spring (tape) 2 occurs to produce resonance.

Furthermore, if there is a tension arm 60 as shown in FIG. 5, a spring system also exists between the arm 60 and tape 2. As a result, as described above, resonance is very likely to be produced because external vibration due to unevenness of reel radius or the like increases especially in high speed tape feeding.

Figure 6:
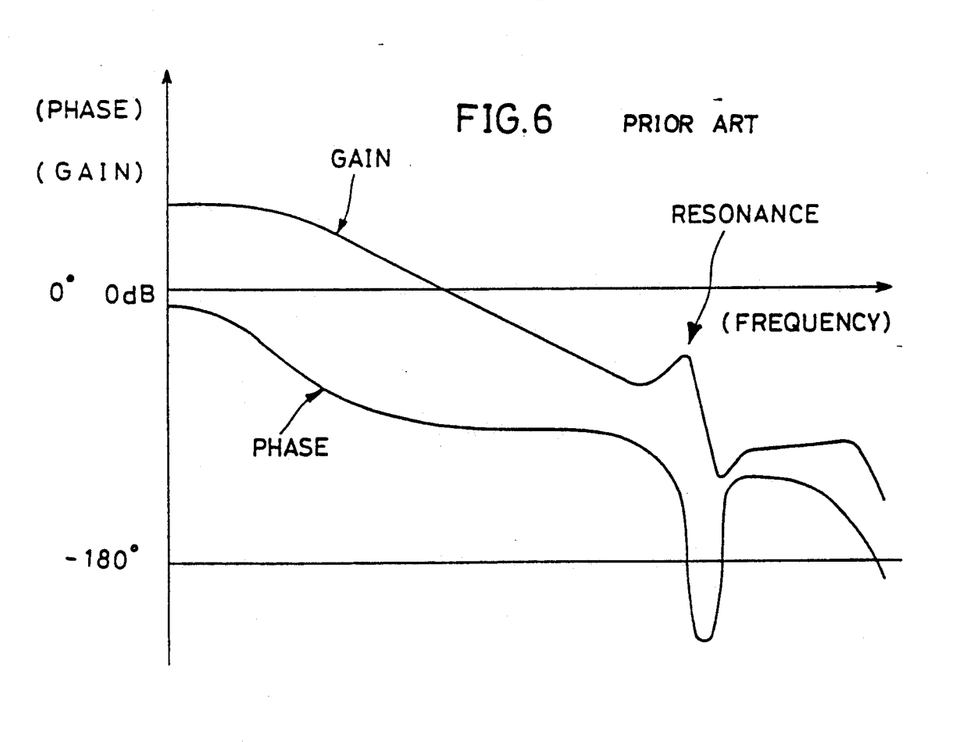
FIG. 6 is a diagram showing the change in phase and gain relative to the frequency in a conventional magnetic recording/reproducing apparatus.

FIG. 6 is a graph showing a frequency characteristic of an open loop transfer function of a magnetic tape running system of a reel-to-reel type magnetic recording/reproducing apparatus which controls the running speed by detecting a running speed of magnetic tape and feeding back the same to a take-up reel.

As shown in FIG. 6, there exists resonance by reels 3, 4 and magnetic tape 2, the phase lags by more than 180° at this point, so that the gain can not be set high for stabilizing the control system. Therefore, the servo system response frequency is limited low, and also with a low gain in a low frequency region, it is difficult to keep deviation small.

SUMMARY OF THE INVENTION

Accordingly, it is an object of the present invention to precisely control running speed and tension in a magnetic recording/reproducing apparatus of reel-to-reel type.

It is another object of the present invention to surely control the tension of magnetic tape constant in a magnetic recording/reproducing apparatus of reel-to-reel type.

It is still another object of the present invention to enhance the accuracy of running speed detection of the magnetic tape in a magnetic recording/reproducing apparatus of reel-to-reel type.

It is yet another object of the present invention to control stably and precisely the tension and the running speed of magnetic tape in a magnetic recording/reproducing apparatus of reel-to-reel type.

It is still another object of the present invention to improve the servo characteristic of control of the tension applied to magnetic tape and its running speed in a magnetic recording/reproducing apparatus of reel-to-reel type.

The above-described objects of the present invention are achieved by a magnetic recording/reproducing apparatus including the following elements. That is to say, a magnetic recording/reproducing apparatus for recording and reproducing data at high speed while feeding magnetic tape from a supply reel to a take-up reel according to the present invention includes a tape speed detecting sensor for detecting running speed of magnetic tape, a supply reel rotation speed detecting sensor for detecting rotation speed of the supply reel, a supply reel radius calculating device for calculating a supply reel radius with the detected tape speed and rotation speed of the supply reel, and a supply reel torque calculating device for calculating torque of the supply reel corresponding to the supply reel radius according to the reel radius calculated by the supply reel radius calculating device.

The magnetic recording/reproducing apparatus according to the present invention does not include a tension arm. Furthermore, it controls tension by controlling the supply reel using the torque proportional to the supply reel radius. As a result, the tension of the magnetic tape is certainly controlled to be constant.

In another aspect of the present invention, a magnetic recording/reproducing apparatus for recording and reproducing data at high speed while feeding magnetic tape from a supply reel to a take-up reel includes a tape speed detecting sensor for detecting running speed of the magnetic tape, and a speed error detecting device for detecting a speed error of the magnetic tape speed detected by the tape speed detecting sensor, and the speed error detecting device detects the speed error of the magnetic tape by comparing frequency difference and phase difference of a tape speed detection signal from the magnetic tape speed detecting sensor and a predetermined reference signal.

The speed of the magnetic tape is detected using not only a frequency difference but also phase difference between a signal from the tape speed detecting sensor and a predetermined reference signal. As a result, the tape running speed detecting accuracy is enhanced.

In still another aspect of the present invention, a magnetic recording/reproducing apparatus for recording and reproducing data at high speed while feeding magnetic tape from a supply reel to a take-up reel includes a tape speed detecting sensor for detecting a running speed of the magnetic tape, a speed error detecting device for detecting a speed error of the magnetic tape connected to the tape speed detecting sensor, a supply reel rotation speed detecting sensor for detecting a rotation speed of the supply reel, a supply reel radius calculating device for calculating a supply reel radius from the tape speed from the tape speed detecting sensor and the rotation speed from the supply reel rotation speed detecting sensor, a supply reel driving device for driving the supply reel to keep the tension of the magnetic tape constant according to the calculated supply reel radius, and a take-up reel driving device for driving the take-up reel according to the calculated supply reel radius and the running speed of the magnetic tape so that the running speed of the magnetic tape is kept constant.

Since a take-up motor driving signal theoretically determined is given to the take-up motor in advance (feeding forward), in addition to feeding back of speed detection information of the magnetic tape to the motor on the take-up reel side, precise control of the tension and the running speed of the magnetic tape is implemented.

In yet another aspect of the present invention, a magnetic recording/reproducing apparatus feeding magnetic tape from a supply reel to a take-up reel to record and reproduce data at a high speed includes a tape speed detecting sensor for detecting a running speed of magnetic tape, a speed error detecting device connected to the magnetic tape speed detecting sensor for detecting a speed error of the magnetic tape, a supply reel rotation speed detecting sensor for detecting a rotation speed of the supply reel, a supply reel radius calculating device for calculating a supply reel radius from the detected tape speed and rotation speed of the supply reel, a supply reel driving device for driving the supply reel according to the calculated supply reel radius and the detected speed error, a take-up reel driving torque calculating device for calculating take-up reel driving torque for keeping the running speed of the magnetic tape constant according to the calculated supply reel radius, and a take-up reel driving device for driving the take-up reel according to the calculated take-up reel driving torque and the detected magnetic tape speed error.

The resonance is eliminated by feeding back the speed detection information of the magnetic tape not only to the motor on the take-up side but also on the supply side. As a result, the servo characteristics in controlling the tension of the magnetic tape and the running speed thereof is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the change in phase and gain relative to the frequency in the case where the present invention is applied to.

DESCRIPTION OF THE PREFERRED EMBODIMENTS

One embodiment of the present invention will be described below referring to figures.

Figure 1:
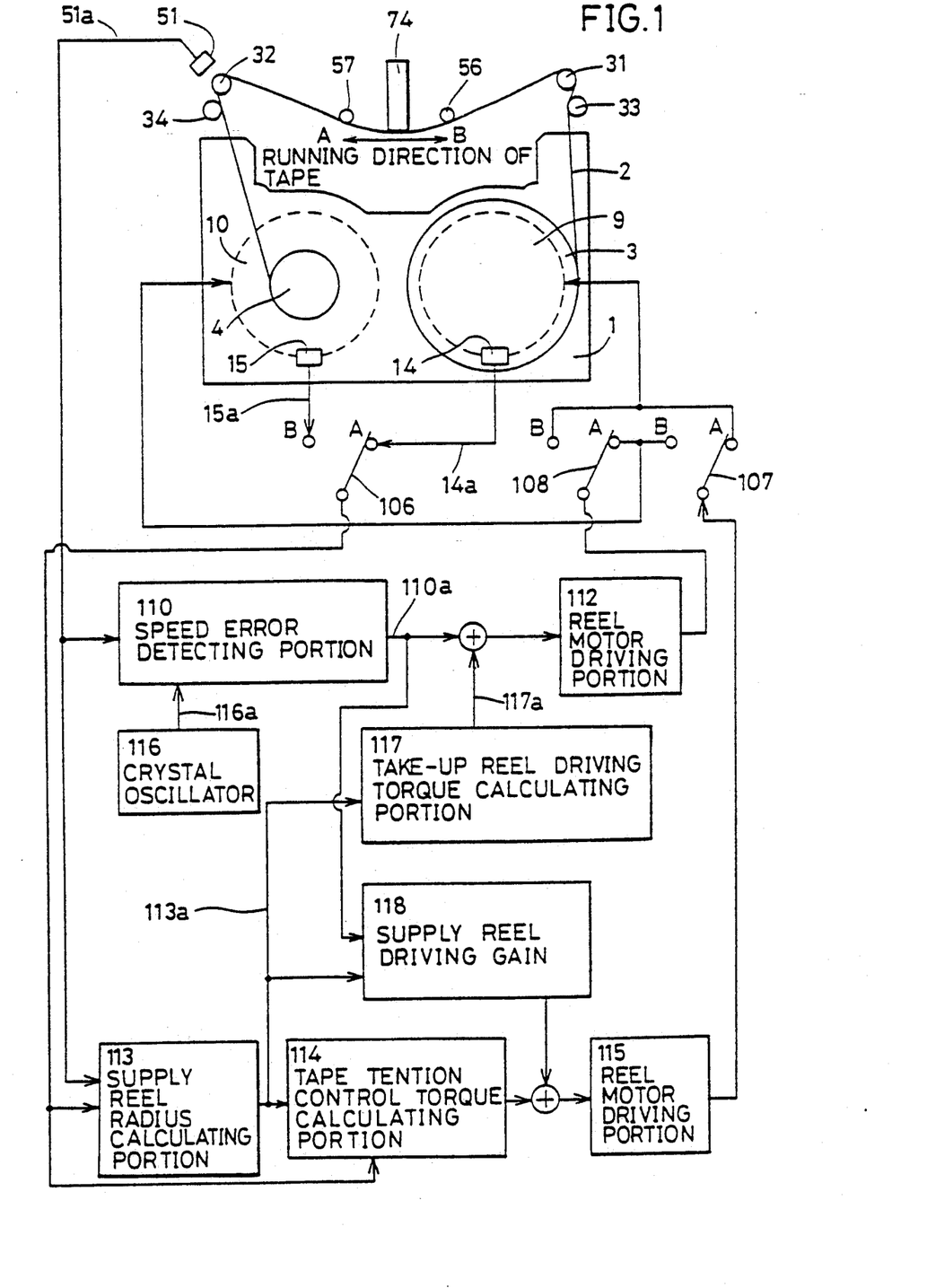
FIG. 1 is a block diagram showing a control device for a magnetic recording/reproducing apparatus according to the present invention.
Figure 2:
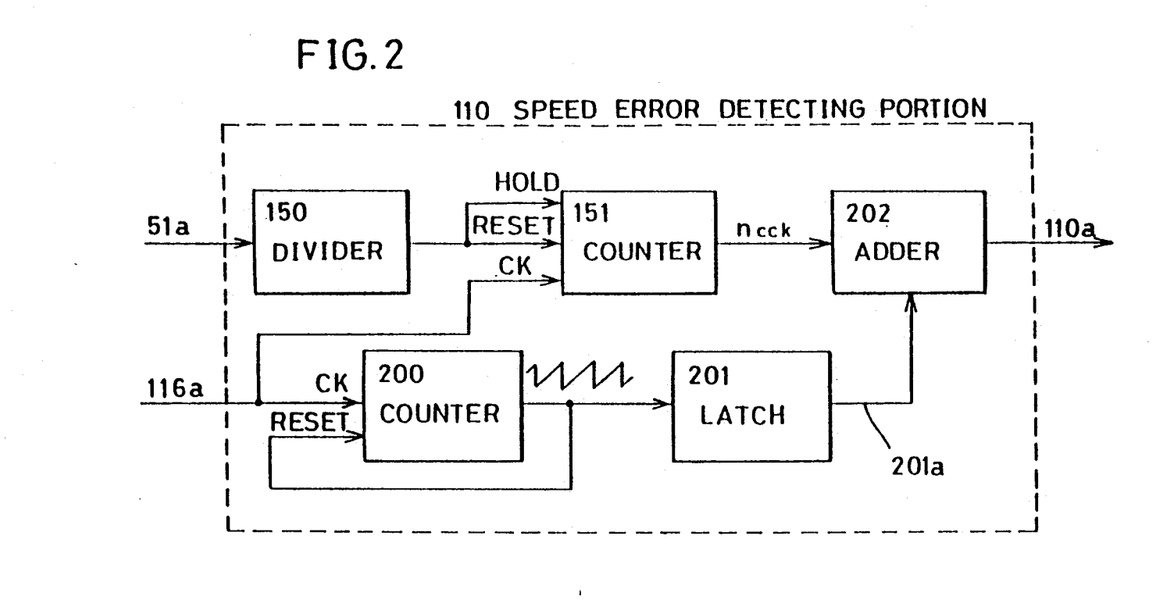
FIG. 2 is a block diagram showing the details of a speed error detecting device shown in FIG. 1.

FIG. 1 is a circuit configuration diagram for controlling the running speed and tension of magnetic tape of a magnetic recording/reproducing apparatus according to one embodiment of the present invention, and FIG. 2 is a circuit configuration diagram showing an interior configuration of a speed error detecting device.

The magnetic recording/reproducing apparatus described here referring to examples records and reproduces a large quantity of data in magnetic tape 2 of a cassette 1 at a high speed.

In a main body of the magnetic recording/reproducing apparatus, an automatic cassette loading mechanism (not shown) is provided for automatically loading a cassette 1 externally inserted. Reels 3, 4 of the cassette 1 automatically loaded by the automatic cassette loading mechanism are driven by a reel driving mechanism described below.

The reel driving mechanism is mounted in a lower portion of a main chassis (not shown) corresponding to a lower portion of the loaded cassette 1, and includes reel motors 9, 10 respectively fixed to the main chassis. FG disks (not shown) are coupled to output axes of reel motors 9, 10, respectively. Then, when cassette 1 is loaded, the respective driving force of reel motors 9, 10 are independently transmitted to reels 3, 4, respectively.

The FG disc is a circular disc having a plurality of slit portions formed at equal pitches on the periphery thereof, and photo interrupters 14, 15 are provided to sandwich the slit portions. That is, the rotation speed of the FG disc, in other words, the rotation speed of reels 3, 4 are detected as pulse outputs of photo interrupters 14, 15, respectively. Also, guide roller 32, which rotates with travel of magnetic tape 2, is employed for detecting running speed v of magnetic tape 2. Guide rollers 31, 33, 34, 56 and 57 simply guide the running magnetic tape 2. Furthermore, 74 is a magnetic head.

Next, referring to FIG. 1, a central control device for of the magnetic recording/reproducing apparatus which controls the running speed and the tension of magnetic tape 2 will be described. In FIG. 1, the running directions of magnetic tape 2 are indicated as A, B. When the running direction is A, reel 3 serves as a supply reel, and reel 4 serves as a take-up reel. On the other hand, when the running direction is B, reel 3 serves as a take-up reel, and reel 4 serves as a supply reel. However, in the description below, it is assumed that magnetic tape 2 runs in the A direction, and 3 serves as a supply reel and 4 as a take-up reel.

First, the control system of the running speed of magnetic tape 2 will be described.

The running speed v of tape 2 is denoted as $$v = 2\pi R_E / T_E \qquad (1)$$

Here, $R_E$ is a radius of guide roller 32 and $T_E$ is the time required to rotate one cycle of guide roller 32.

Photo interrupter 51 provided in the vicinity of guide roller 32 and serving as a speed signal generator for detecting rotation of guide roller 32 outputs $N_{FGRE}$ pulse signals as FG signal 51a for each revolution of guide roller 32. The FG signal 51a, a signal for giving rotation cycle $T_E$ of guide roller 32, is sent to speed error detecting device 110. Here, the cycle of FG signal 51a is $T_{FGRE}$.

The FG signal 51a is demultiplied by a factor $n_{av}k$ where $n_{av}$ is a preselected number of pulses. Thus, an FG signal 51a is generated for every $n_{av}T_{FGRE}$. If, during the time period $n_{av}T_{FGRE}$, the number of pulses of a reference signal )provided by the output signal of crystal oscillator 116 and having a cycle $T_{CK}$) is denoted as $n_{cck}$, then $$n_{cck} \cdot T_{ck} = n_{av} \cdot T_{FGRE} \qquad (2)$$

Also, the rotation cycle $T_E$ of guide roller 32 can be expressed as, $$T_E = N_{FGRE} \cdot T_{FGRE} \qquad (3)$$

Accordingly from the expressions (1), (2) and (3), $$v = \frac{2\pi R_E}{N_{FGRE}} \cdot \frac{N_{av}}{T_{CK}} \cdot \frac{1}{n_{cck}} \qquad (4)$$

Data of the reference speed of magnetic tape 2 is given by the output signal of crystal oscillator 116.

Accordingly, by detecting $n_{cck}$ and inserting the detected result into (4) expression, the running speed v of magnetic tape 2 can be calculated. As the values except $n_{cck}$ in the right member of the (4) expression are constant values, by controlling $n_{cck}$ constant, the running speed v of magnetic tape 2 can be kept constant.

Speed error detecting device 110, in which a FG signal 51a and a reference signal 116a of crystal oscillator 116 are inputted, is made to output a speed error signal 110a.

FIG. 2 shows an interior configuration of speed error detecting device 110.

The FG signal 51a is inputted into frequency divider 150. As the FG signal 51a is $n_{av}$-demultiplied, a pulse is generated for every time $n_{av} \cdot T_{FGRE}$. A counter 151 counts and holds the reference signal 116a for each of the cycles. This count value is $n_{cck}$, which value is proportional to a frequency ratio of a reference signal 116a generated by crystal oscillator 116 and the FG signal 51a. Accordingly, $n_{cck}$ is a frequency error signal, which indicates the error of the running speed v of magnetic tape 2 from a reference value. That is, the frequency divider 150 and the counter 151 constitute a frequency error detecting device for detecting frequency difference or frequency ratio of the FG signal 51a of the photo interrupter 51 (corresponding to a pulse signal of the speed signal generator) and the reference signal 116a of the crystal oscillator 116 (corresponding to a reference signal of the reference signal generator).

Counter 200 counts each pulse of the reference signal 116a and is reset every $n_{ccko}$ pulses. Here, $n_{ccko}$ is a reference value of a frequency error signal $n_{cck}$ corresponding to the reference speed $v_o$, which is found by reverse calculation from the expression (4). Accordingly, the count value of counter 200 repeats the values between 0 to $n_{ccko}$. The value of $n_{cck}$ is determined for every time $n_{av} \cdot T_{FGRE}$ described above, and a latch 201 is constituted to detect and hold the count value of counter 200 simultaneously. An output of the latch 201 is a phase error signal 201a proportional to the phase difference of reference signal 116a and FG signal 51a. That is, the counter 200 and the latch 201 constitute a phase error detecting portion for detecting phase difference of FG signal 51a of the photo interrupter 51 and reference signal 116a of the crystal oscillator 116.

The above described frequency error signal $n_{cck}$ indicates a frequency error for every time $n_{av} \cdot T_{FGRE}$, or a speed error. The phase error signal is found by integrating a speed error. That is, since a value obtained by accumulating speed error is the phase error signal 201a, it indicates a speed error in the long cycle - DC components rather than the above time $n_{av} \cdot T_{FGRE}$. Accordingly, giving consideration to the phase error signal 201a, more precise detection can be implemented than expressing the speed error only by frequency error.

As described above, the referring signal 116a and the FG signal 51a denote the frequency error and phase error of the running speed v of magnetic tape 2, respectively, which are added at an appropriate ratio by an adder 202 to be a speed error signal 110a. The speed error signal 110a indicates the speed error. When the speed error signal 110a is large, the running speed of magnetic tape 2 is lower than a reference value and when it is small, the running speed is high in this embodiment.

Now, the driving torque $M_T$ of a take-up reel motor 10 necessary for keeping the driving speed v of magnetic tape 2 constant will be discussed in detail here.

In case where the driving torque $M_T$ generated by take-up reel motor 10 is equal to the sum of the load torque due to the tension applied to magnetic tape 2 and the torque loss $M_o$ in the take-up reel axis and so forth, the running speed v of magnetic tape 2 becomes constant. Accordingly, when the desired tape tension is denoted by F (constant), and the radius of take-up reel 4 (hereinafter "radius of the take-up reel" means the dimension from the center of the reel to the outer periphery of the tape when the tape is wound on the reel) is denoted as $R_T$, then, $$M_T = R_T F + M_o \qquad (5)$$

Also, with an output 113a of a supply reel radius calculating device 113 described later in detail giving the radius of supply reel 3 (hereinafter "radius of the supply reel" means a dimension from a center of the reel to the periphery of the tape when the tape is wound on the reel), if the radius of supply reel 3 is denoted as $R_S$, the radius $R_T$ of take-up reel 4 is obtained as follows, $$R_T = (S - R^2_S)^{\frac{1}{2}} \qquad (6)$$

Here, S is a constant determined by length and thickness dimensions of magnetic tape 2.

Accordingly, when the radius $R_s$ of supply reel 3 is given, by using the expressions (6) and (5), driving torque $M_T$ of take-up reel 4 for keeping the running speed v of magnetic tape 2 constant can be obtained.

Furthermore, when a torque constant of reel motors 9, 10 is $K_M$, $$V_M = R/K_M \cdot M_T + K_M \cdot \omega \qquad (7)$$

Here, $V_M$ is a terminal voltage of reel motors 9, 10, R is a coil wiring resistance, and $\omega$ is a rotation angular velocity.

$\omega$ is obtained by $\omega = v / R_T$. Also, the expression (7) can be modified with the expression (5) as follows, $$V_M = R / K_M \cdot (R_T F + M_o) + K_M \cdot v / R_T \qquad (8)$$

When the radius $R_T$ of take-up reel 4 is obtained from the expression (6), the driving voltage $V_M$ of take-up reel motor 10 can be calculated from the expression (8).

Figure 3:
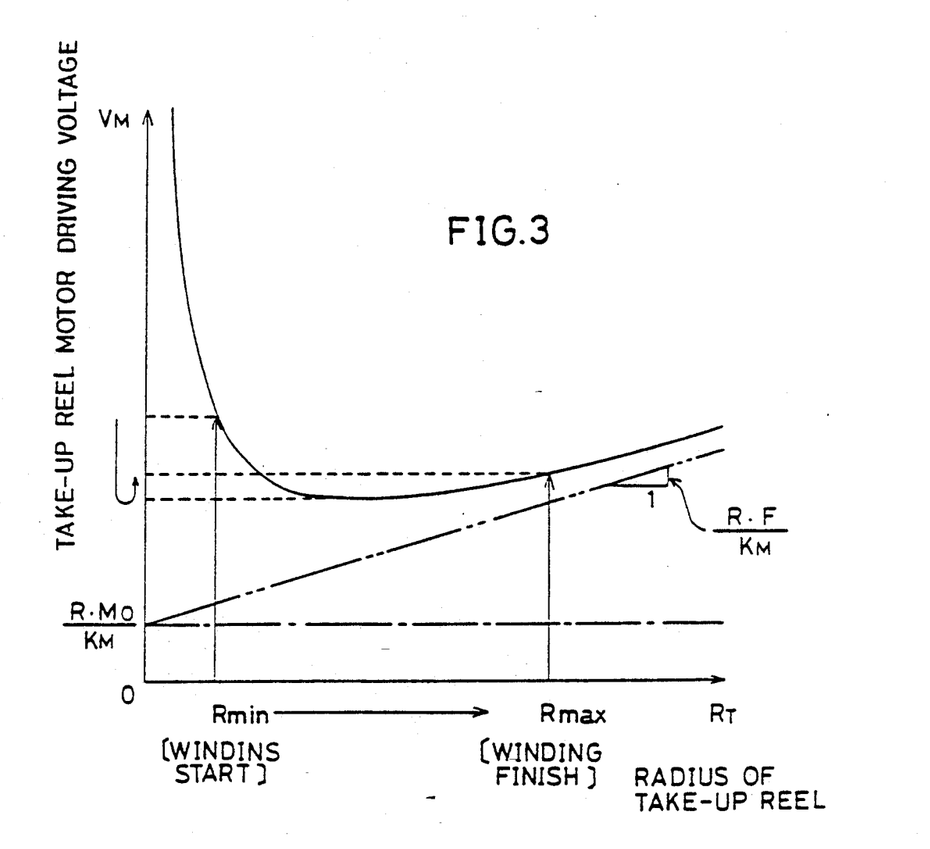
FIG. 3 is a graph showing the relationship between a take-up reel radius and a take-up reel motor driving voltage.

FIG. 3 is a graph showing the relationship of the driving voltage $V_M$ of take-up reel motor 10 and the radius $R_T$ of take-up reel 4 shown in the expression (8).

As the magnetic tape 2 runs, the radius $R_T$ of the take-up reel 4 increases from $R_{min}$ to $R_{max}$. At this time, the driving voltage $V_M$ of take-up reel motor 10 necessary for driving the magnetic tape 2 at a constant running speed v while keeping constant tension F, once drastically decreases and then gradually increases as shown in FIG. 3.

The take-up reel driving torque calculating device 117 shown in FIG. 1, in which the radius $R_s$ of supply reel 3 which is an output 113a of a supply reel radius calculating device 113 described later is inputted, outputs a signal of driving voltage $V_M$ of take-up reel motor 10 according to the above expressions (6) and (8).

The driving voltage $V_M$ of take-up reel motor 10 provided as an output 117a of the take-up reel driving torque calculating device 117 and the speed error signal 110a which is an output of the above-described speed error detecting device 110 are added to be introduced into reel motor driving device 112. The reel motor driving device 112 is a driver circuit for generating electric power for driving reel motors 9, 10, respectively, according to the inputted signals. A switch 108 which is alternately switched according to setting of a running direction of magnetic tape 2 is provided between reel motor driving device 112 and reel motors 9, 10. In the figure, A, B shown with switch 108 correspond to setting of the running directions A, B (the same can be said about switches 106, 107 described later). In other words, when a contact point of switch 108 is A, with reel 4 serving as a take-up reel, the output voltage of reel motor driving device 112 is supplied to reel motor 10 driving a take-up reel, and the magnetic tape 2 is taken up from reel 4 to reel 3 by the rotation driving force.

The driving control system on the side of take-up reel 4 is constituted as described above, by which closed loop speed control system the running speed v of magnetic tape 2 is constant-speed-controlled at the above reference speed. At this time, as will be described later, control is also performed on the supply reel 3 side, and the speed control is performed by both of the reel driving controls.

Now, the pulse number $n_{cck}$ of the reference signal 116a is detected for every time $n_{av} \cdot T_{FGRE}$, then the sampling cycle $T_{vsmpl}$ is expressed as follows, $$T_{vsmpl} = n_{av} \cdot T_{FGRE} \qquad (9)$$

Accordingly, in order to increase the sensitivity of control of running speed v of magnetic tape 2, $n_{av}$ is made small.

Also, the expression (4) can be rearranged as follows, $$n_{cck} = \frac{2\pi R_E}{N_{FGRE}} \cdot \frac{n_{av}}{T_{ck}} \cdot \frac{1}{V} \qquad (10)$$

Thus, as the pulse number $N_{cck}$ of the reference signal 116a is proportional to $N_{av}$, the quantization error can be reduced by increasing $n_{av}$.

As described above, the sensitivity of control and the quantization error change depends upon the value of $n_{av}$, so that it is necessary to select an appropriate value of $n_{av}$ by the expressions (9) and (10).

Next, the control system for keeping the tape tension applied to magnetic tape 2 in contact with a magnetic head 74 constant will be described.

The FG signal 14a outputted from photo interrupter 14 which is a supply reel rotation detecting device includes data of rotation cycle $T_s$ of supply reel 3, which is provided to supply reel radius calculating device 113 and tape tension control torque calculating device 114 through switch 106. Also, the FG signal 51a outputted from photo interrupter 51 includes data of the rotation cycle $T_E$ of guide roller 32 as described above, and is provided to supply reel radius calculating device 113 as well as speed error detecting device 110.

The above supply reel radius calculating device 113 has such a circuit configuration to calculate the radius $R_s$ of supply reel 3 in the case where the running direction of magnetic tape 2 is A in the following method. Also, the same is true in the case where the running direction of magnetic tape 2 is B.

The relationship of rotation cycle $T_s$ of reel 3, radius $R_s$ of the supply reel and the running speed v of magnetic tape 2 is expressed as follows, $$v = 2\pi R_s / T_s \qquad (11)$$

by eliminating v from the above-described expressions (1) and (11), $$R_s = R_E \cdot T_S / T_E \qquad (12)$$

To supply reel radius calculating device 113, the FG signal 51a of cycle $T_{FGRE}$ from photo interrupter 51 is led, and also the FG signal 14a is led from photo interrupter 14 through switch 106. Photo interrupter 14 provides $N_{FGS}$ pulse signals as FG signal 14a for each revolution of the take-up reel 4. The cycle of the FG signal 14a is $T_{FGS}$.

Accordingly, the following expression is obtained, $$T_S = N_{FGS} \cdot T_{FGS} \qquad (13)$$

The FG signal 14a is demultiplies by a factor $n_{aT}$, where $n_{aT}$ is a preselected number of pulses. Thus, an FG signal 51a is generated for every $n_{aT}$ pulses and, accordingly, for each time period $n_{aT} T_{FGS}$. If, during the time period $n_{aT} T_{FGS}$, the number of pulses provided by FG signal 51a is denoted as $n_{CRE}$, the following expression holds.

$$n_{CRE} \cdot T_{FGRE} = n_{aT} T_{FGS} \qquad (14)$$

Accordingly, from the expressions (3), (12), (13) and (14), the following expression holds.

$$R_S = \frac{N_{FGS} \cdot R_E}{N_{FGRE} \cdot n_{aT}} \cdot n_{CRE} \qquad (15)$$

Accordingly, by measuring $n_{CRE}$, the radius $R_S$ of supply reel 4 can be calculated. That is, the radius $R_S$ of supply reel 4 is calculated by measuring the pulse number of the FG signal 51a for each cycle obtained by $n_{aT}$-demultiplying the FG signal 14a with cycle $T_{FGS}$ and inserting this as $n_{CRE}$ into the expression (15).

The output 113a including data of the radius $R_S$ of supply reel 4 calculated by supply reel radius calculating device 113 is outputted to a tape tension control torque calculating device 114.

Tape tension control torque calculating portion 114 had such a circuit configuration as calculates the reel driving torque $M_S$ necessary for keeping the aimed value, the tape tension F, previously set according to the output 113a by the following expression. Here, the torque loss due to the viscous resistance of bearing and so forth (not shown) is $M_L$.

The tape tension F in a steady state can be expressed as, $$F = (M_S + M_L) / R_S \qquad (16)$$

The torque loss $M_L$ can be generally divided into the viscous resistance $M_{LR}$ of the reel bearing, and the viscous resistance, friction resistance $M_{LO}$ of other guide members (guide rollers 31, 33, 34, 56, 57 and so forth).

The viscous resistance $M_S$ of the reel bearing, as it is proportional to the rotation speed of the reel, can be expressed as follows with the coefficient of viscosity $D_{LR}$.

$$M_{LR} = D_{LR} \cdot 2\pi / T_S \qquad (17)$$

Accordingly, the expression (16) is modified as follows, $$F = (M_X + M_{LO} + D_{LR} \cdot 2\pi / T_S) / R_S \qquad (18)$$

and then, $$M_S = F \cdot R_S - M_{LO} - D_{LR} \cdot 2\pi / T_S \qquad (19)$$

The expression (19) is an expression of relation in a stationary state. While previously setting the tape tension F, the data of the viscous resistance, friction resistance $M_{LO}$ of guide members, respectively, inserting the radius $R_S$ of supply reel 4 into the expression (19), then the reel driving torque $M_S$ is calculated.

By controlling driving of supply reel 4 with this reel driving torque MS, the tape tension is controlled at a constant F, and furthermore, the following control is performed.

That is, the error between the running speed v of magnetic tape 2 and the reference speed is outputted as a speed error signal 110a from speed error detecting device 110. According to the speed error signal 110a, take-up reel motor 10 is controlled. The output (speed error signal 110a) of this speed error detecting device 110 is also guided to reel motor driving device 115 driving supply reel motor 9 passing through supply reel driving gain 118. While feed back control is performed to drive take-up reel according to the speed error signal 110a, by applying the similar speed feed back to supply reel 3, the gain of speed control is enhanced and the change in the tape tension can be restrained.

The driving torque $M_S'$ of supply reel motor 9 given by supply reel driving gain 118 is expressed as, $$M_S' = -(J_S \cdot R_T)/(J_T \cdot R_S) \cdot M_T' \qquad (20)$$

or as, $$M_S' = -(J_S \cdot R_T)/(J_T \cdot R_S) \cdot K_M/R \cdot V_M' \qquad (21)$$

Here, $M_T'$ is driving torque of take-up reel motor 10 calculated according to the speed error signal 110a and so forth, $J_T$ is moment of inertia of take-up reel 4 and take-up reel motor 10, $R_T$ is the radius of take-up reel, $J_S$ is moment of inertia of supply reel 3 and supply reel motor 9, and $R_S$ is a radius of supply reel 3. Also, $V_M'$ is a driving voltage of take-up reel motor 10 according to the speed error signal 110a, and $K_M$, R are above-described motor constants. "−" indicates that when take-up reel motor 10 is accelerated, it is driven in a direction for reducing tape tension, and when take-up reel motor 10 is decelerated, it is driven in the direction for increasing the tape tension.

The driving torque of supply reel motor 9 is controlled according to the driving torque $M_S'$ of take-up reel motor 10 obtained according to the expression (20) or (21), so that the speed error signal 110a is fed back to both of take-up reel motor 10 and supply reel motor 9. At this time, the circumferential speed at the tape feeding point of supply reel 3 and the circumferential speed at the tape taking-up point of take-up reel 4 are dynamically equal, so that the tape tension does not change even in accelerating/decelerating due to the control.

Figure 4:
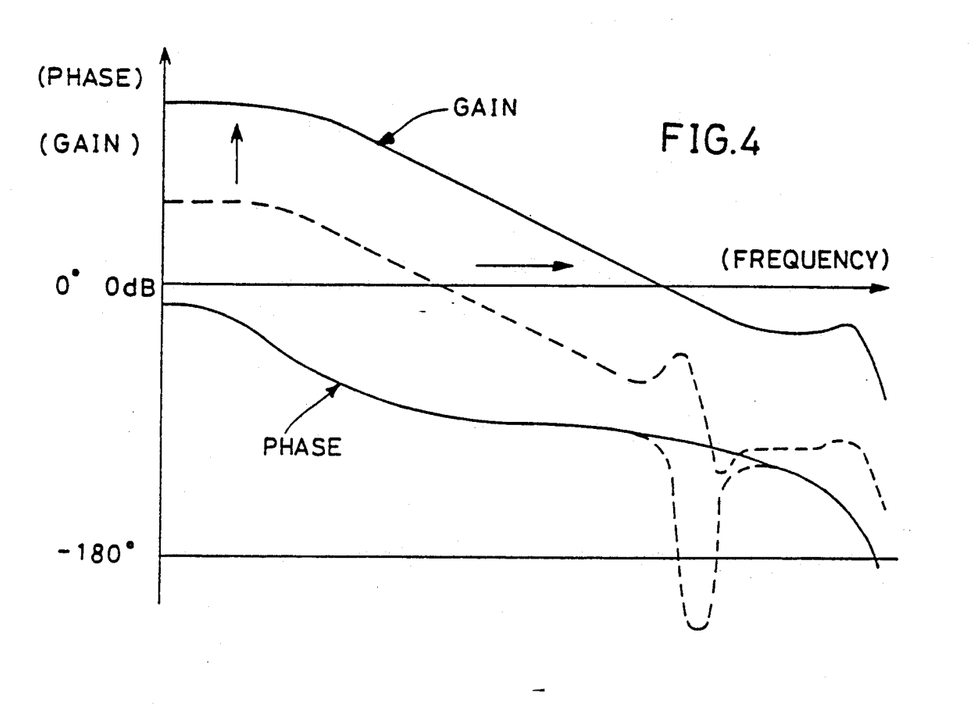

As a result, the open loop transfer function of the servo becomes something like shown in FIG. 4, and the resonance peak as shown in FIG. 3 does not occur. Accordingly, the servo gain can be increased to obtain good servo characteristic.

The radius $R_X$, $R_T$ of each reel 3, 4 and moments of inertia $J_S$, $J_T$ change as the magnetic tape 2 runs, and the radius $R_T$ of take-up reel 4 is obtained according to the radius $R_S$ of supply reel 3 (refer to the expression (6)). Also, since the moments of inertia $J_S$, $J_T$ correspond to a reel radius in a one-to-one manner, the driving torque $M_S'$ of take-up reel motor 10 is calculated by the above expression (20) or (21) with a previously formed table for obtaining the moments of inertia $J_S$, $J_T$ corresponding to the radius $R_S$ of supply reel 3.

To supply reel driving gain 118, a speed error signal 110a of speed error detecting device 110 is led. Also, to the supply reel driving gain 118, a signal proportional to the radius $R_S$ of the supply reel which is an output 113a of supply reel radius calculating device 113 is led. In the embodiment, the driving torque $M_S'$ of take-up reel motor 10 is calculated by supply reel driving gain 118 according to the expression (21). This is added with the reel driving torque $M_S$ included in the output 114a of tape tension control torque calculating portion 114 to be led to reel motor driving portion 115, where electric current necessary for obtaining reel driving torque is generated to be supplied to reel motors 9, 10 through switch 107.

That is to say, when the running direction of magnetic tape 2 is A, the switch 107 is set at A, and the output current of reel driving device 115 is supplied to reel motor 9 which is a supply reel driving means. On the other hand, when the driving direction of magnetic tape 2 is B, the switch is set at B, and the output current of reel driving portion 115 is supplied to reel motor 10 which is a supply reel driving means.

By the tape running control system constituted as described above, the tape tension of magnetic tape 2 is always controlled at the above F value regardless of setting of the running direction of magnetic tape. At the same time, combined with the control of the running speed v of the magnetic tape 2, a stable running of the magnetic tape 2 is implemented.

Now, an electric circuit is employed for implementing a function of the present invention herein, but it is a matter of course that they may be composed of software employing computers and so forth.

Also, when reel motor driving portion 112 for driving the take-up reel above described is constituted as current feed back type, the take-up reel is torque-controlled, the output of take-up reel driving torque calculating portion 117 can be constituted to output data of take-up reel driving torque $M_T$ according to the above expression (5), and the driving torque $M_S'$ of the supply reel motor given by supply reel driving gain 118 can be calculated directly employing the expression (20).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording/reproducing apparatus for recording and reproducing data at a high speed while feeding magnetic tape from a supply reel to a take-up reel, comprising:
    tape speed detecting means for detecting a running speed of said magnetic tape;
    supply reel rotation speed detecting means for detecting a rotation speed of said supply reel;
    supply reel radius calculating means for calculating a supply reel radius from said tape speed and supply reel rotation speed; and
    supply reel torque calculating means for calculating torque of the supply reel corresponding to the supply reel radius according to the reel radius calculated by said supply reel radius calculating means.

2. The magnetic recording/reproducing apparatus according to claim 1, wherein
    when said magnetic tape is fed, said magnetic tape is guided by a plurality of guides,
    predetermined torque is consumed by said guides,
    the number of revolutions of said supply reel changes with the change of said supply reel radius,
    load torque of said supply reel changes with change of the number of revolutions of said supply reel, and
    said supply reel torque calculating means calculates torque necessary for said supply reel based on the predetermined torque consumed by said guides and the change of the load torque of said supply reel.

3. A magnetic recording/reproducing apparatus for recording and reproducing data at a high speed while feeding magnetic tape from a supply reel to a take-up reel, comprising:
    tape speed detecting means for detecting a running speed of said magnetic tape;
    speed error detecting means for detecting a speed error of said magnetic tape connected to said tape speed detecting means, and wherein
    said speed error detecting means detects a speed error of said magnetic tape by detecting frequency difference and phase difference between a tape speed detection signal from said magnetic tape speed detecting means and a predetermined reference signal.

4. The magnetic recording/reproducing apparatus according to claim 3, wherein
    said magnetic tape speed detecting means comprises a roller,
    a rotation pulse signal is supplied as an output as said roller rotates in contact with said magnetic tape, and
    said speed error detecting means detects frequency difference and phase difference of a rotation pulse signal of said roller and said predetermined reference signal.

5. A magnetic recording/reproducing apparatus for recording and reproducing data at a high speed while feeding magnetic tape from a supply reel to a take-up reel, comprising:
    a tape speed detecting sensor for detecting a running speed of said magnetic tape;
    speed error detecting means for detecting a speed error of said magnetic tape connected to said tape speed detecting means;
    supply reel rotation speed detecting means for detecting a rotation speed of said supply reel;
    supply reel radius calculating means for calculating said supply reel radius from said detected tape speed and supply reel rotation speed;
    a supply reel driving means for driving said supply reel based on required torque of said supply reel to keep tension of said magnetic tape constant according to said calculated supply reel radius to control the supply reel according to the same; and
    take-up reel driving means for driving said take-up reel according to said calculated supply reel radius and said magnetic tape running speed so that the running speed of said magnetic tape is kept constant.

6. A magnetic recording/reproducing apparatus for recording and reproducing data at a high speed while feeding magnetic tape from a supply reel to a take-up reel, comprising:
    tape speed detecting means for detecting a running speed of said magnetic tape;
    speed error detecting means connected to said tape speed detecting means for detecting a speed error of said magnetic tape;

supply reel rotation speed detecting means for detecting a rotation speed of said supply reel;

supply reel radius calculating means for calculating a radius of said supply reel from said detected tape speed and said supply reel rotation speed;

supply reel driving means for driving said supply reel on the basis of said calculated supply reel radius and said detected speed error;

take-up reel driving torque calculating means for calculating driving torque of said take-up reel on the basis of said calculated supply reel radius so that the running speed of said magnetic tape is constant; and take-up reel driving means for driving said take-up reel on the basis of said calculated take-up reel driving torque and detected magnetic tape speed error.

7. The magnetic recording/reproducing apparatus according to claim 6, wherein said magnetic tape speed detecting means includes a rotation roller, a rotation pulse signal is provided when said rotation roller rotates in contact with said magnetic tape, and said speed error detecting means detects a speed error of said magnetic tape from rotation cycle information and rotation phase information of said rotation roller between a rotation pulse signal of said rotation roller and a predetermined reference signal.

8. A magnetic recording/reproducing apparatus for recording and reproducing data at a high speed while feeding magnetic tape from a supply reel to a take-up reel, comprising:

tape speed detecting means for detecting a running speed of said magnetic tape;

take-up reel motor control means for controlling a driving motor of said take-up reel to maintain the speed constant when said magnetic tape is fed; and supply reel motor control means for controlling a driving motor of said supply reel to maintain the tension of said magnetic tape constant when said magnetic tape is fed, wherein said supply reel side motor control means is responsive to the running speed of said magnetic tape and the radius of said take-up reel.

9. The magnetic recording/reproducing apparatus according to claim 8, wherein said take-up reel side motor control means comprises running speed error detecting means for detecting a running speed error of said magnetic tape, and take-up reel radius detecting means for detecting a radius of said take-up reel.

10. The magnetic recording/reproducing apparatus according to claim 9, wherein said supply reel side motor control means comprises supply reel radius detecting means for detecting a radius of said supply reel, and tape tension setting means for setting tension of said magnetic tape from said detected radius and said magnetic tape running speed.

* * * * *